INVENTORS
Otto BARTHRUFF
Walter RÜHLE
BY
*Michael S. Striker*
their ATTORNEY

INVENTORS
Otto BARTHRUFF
Walter RÜHLE
BY
*Michael S. Striker*
their ATTORNEY

United States Patent Office 3,493,802
Patented Feb. 3, 1970

3,493,802
ELECTRICAL MACHINE
Otto Barthruff, Stuttgart, and Walter Ruehle, Korntal, Germany, assignors to Robert Bosch GmbH, Stuttgart, Germany
Filed Sept. 26, 1968, Ser. No. 762,728
Claims priority, application Germany, Oct. 5, 1967, B 94,820
Int. Cl. H01r 39/38
U.S. Cl. 310—239      10 Claims

ABSTRACT OF THE DISCLOSURE

An electrical machine, particularly a small D-C motor, wherein the brushes which bear against the peripheral surface of the commutator are biased by helical springs inserted into cup-shaped brush holders of synthetic plastic material. Each brush holder has a T-shaped projection which is received in a T-shaped opening provided in a plate-like carrier mounted in the housing adjacent to the commutator. The projections have grooves which receive edge portions of the carrier in response to bias of springs in the brush holders.

BACKGROUND OF THE INVENTION

The present invention relates to electrical machines in general, especially to small electric motors, wherein a rotary commutator is engaged by brushes which are biased thereagainst by springs.

In conventional electrical machines of the just outlined character, the brushes are movably mounted in brush holders which are secured to a carrier by screws, bolts or like fasteners. The manufacture of such fasteners involves additional cost and the attachment of brush holders to the carrier by means of fasteners takes up much time and must be performed by resorting to tools which renders such types of brush holders unsuitable for assembly with the carrier in automatic machines. Moreover, a connection which is established by bolts or screws is likely to become loose when the machine is in use, especially if the machine or its parts are subject to vibration, and any loosening of brush holders is likely to affect the operation of the machine.

It is also known to insert the brush holders into bores provided therefor in the carrier of an electrical machine and to employ additional springs which resemble strips and serve to retain the brush holders in their bores. In the assembly of such machines, the springs are pressed in predetermined positions against the respective brush holders and are thereupon inserted into the bores of the carrier. Each spring is provided with a protuberance which snaps into a recess of the carrier, and such recesses are accessible from the outside to permit insertion of tools when the operator wishes to remove a brush holder from its bore. This mode of mounting the brush holders is quite complicated and expensive because it requires separate springs, specially configurated bores in the carrier, and the use of tools for separation and removal of brush holders. Moreover, the parts must be finished with a high degree of precision and the assembly consumes too much time.

SUMMARY OF THE INVENTION

One of the objects of the present invention is to provide an electrical machine, particularly a D-C motor, wherein the brush holders can be installed in or removed from the housing of the machine in a material- and time-saving manner.

Another object of the invention is to provide novel brush holders and a novel brush holder carrier for use in the just outlined machine.

A further object of the invention is to provide a machine wherein the brush holders are mounted in such a way that they cannot vibrate in the housing, that their connections with the housing cannot be accidentally weakened or terminated when the machine is in use, and wherein the brush holders can be mounted or removed without resorting to any tools.

An additional object of the invention is to provide an electrical machine wherein the brushes and their holders can be mounted by resorting to automatic assembly machinery.

The invention is embodied in an electrical machine, particularly in an electric motor which comprises a housing, a commutator rotatably mounted in the housing and having a peripheral surface engaged by brushes which are movable radially of the commutator in preferably cup-shaped brush holders which preferably consist of synthetic plastic material. The housing comprises or accommodates a carrier and such carrier and the brush holders are provided with interengaging male and female coupling portions. Resilient means, preferably in the form of helical springs, are inserted into brush holders to bias the brushes against the peripheral surface of the commutator and to simultaneously maintain the coupling portions of the brush holders in requisite engagement with the complementary coupling portions of the carrier in such a way that the brush holders are held against movement radially and away from the commutator.

It is preferred to employ a plate-like carrier which is located in a plane extending at right angles to the axis of the commutator, and the female coupling portions preferably form part of the carrier and are provided with preferably T-shaped openings to permit passage of T-shaped male coupling portions or projections provided on the brush holders. Each such projection is preferably formed with several grooves which receive edge portions of the plate-like carrier in response to bias of springs against the corresponding brushes and their carriers. In other words, each spring bears against the corresponding brush to urge the latter against the peripheral surface of the commutator and each spring reacts against the corresponding brush holder to urge the latter radially and away from the commutator and to thereby maintain the coupling portion of the brush holder in requisite engagement with the corresponding coupling portion of the carrier.

The novel features which are considered as characteristic of the invention are set forth in particular in the appended claims. The improved electrical machine itself, however, both as to its construction and the mode of assembling the same, together with additional features and advantages thereof, will be best understood upon perusal of the following detailed description of a specific embodiment with reference to the accompanying drawing.

BRIEF DECRIPTION OF THE DRAWING

DESCRIPTION OF THE PREFERRED EMBODIMENT

Figure 1:
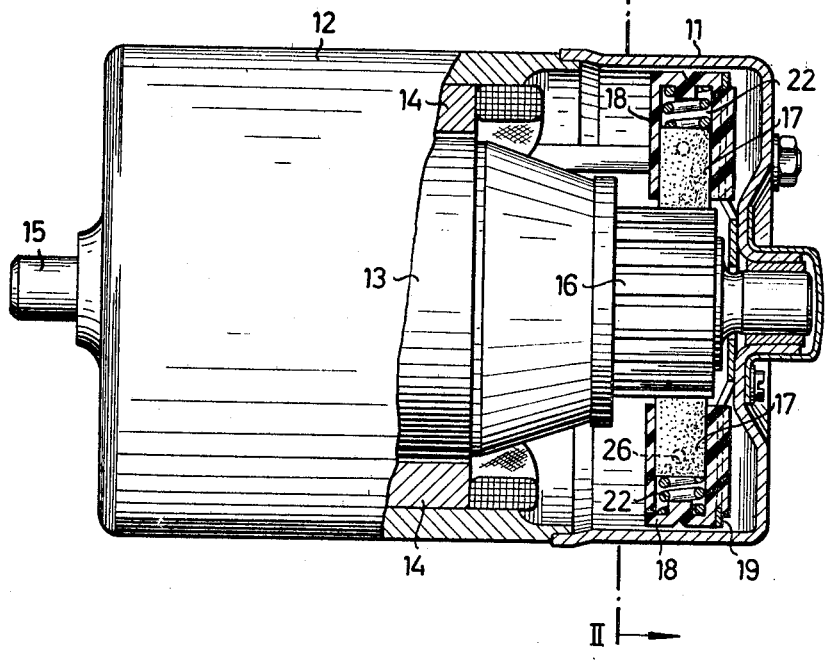
FIG. 1 is a partly elevational and partly axial sectional view of a small D-C motor which embodies the invention.
Figure 2:
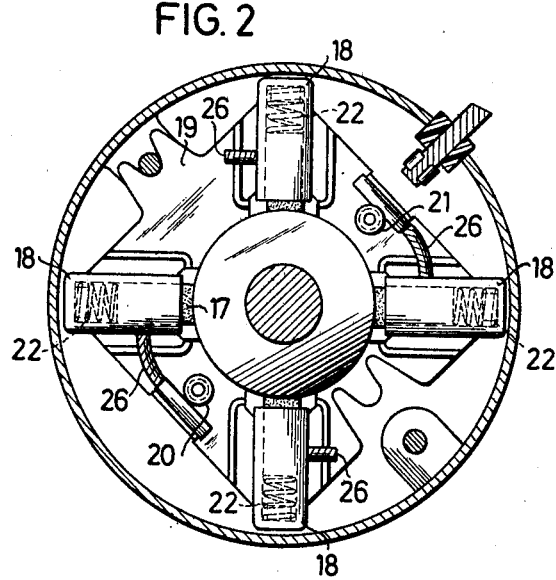
FIG. 2 is a transverse vertical sectional view as seen in the direction of arrows from the line II—II of FIG. 1.
Figure 3:
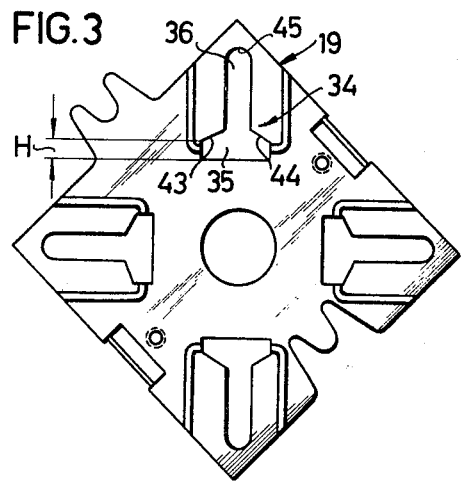
FIG. 3 is a plan view of the carrier.
Figure 5:
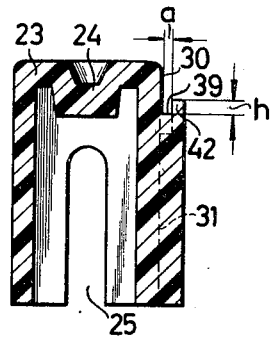
FIG. 5 is a central longitudinal sectional view of the brush holder as seen in the direction of arrows from the line V—V of FIG. 4.

The motor which is shown in FIGS. 1 and 2 comprises a housing including a cylindrical main portion 12 and a cover 11 attached to the open end of the main portion 12. The interior of the housing accommodates an armature 13 which is rotatable between field magnets 14. The shaft 15 of the armature 13 is journalled in the portions 11, 12 of the housing and carries a commutator 16 which is received in the interior of the cover 11 and cooperates with four equidistant radially extending brushes 17 reciprocably mounted in cup-shaped brush holders 18 consisting of synthetic plastic material and removably coupled to a metallic plate-like carrier 19 best shown in FIG. 3. The carrier 19 is attached to the bottom wall of the cover 11 by two screws 20, 21 shown in FIG. 2. The means for biasing the brushes 17 against the peripheral surface of the commutator 16 comprises helical springs 22 which are inserted into the respective brush holders 18 and react against their bottom walls 23 (FIG. 5). The bottom walls 23 are formed with cylindrical protuberances 24 which extend into and center the outermost convolutions of the respective springs 22. In accordance with a feature of the present invention, the springs 22 also serve as a means for maintaining the respective brush holders 18 in requisite engagement with the carrier 19.

Figure 6:
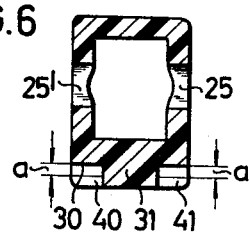
FIG. 6 is a transverse sectional view of the brush holder as seen in the direction of arrows from the line VI—VI of FIG. 4.

Each brush holder 18 has an open-ended tubular portion or shell which extends radially inwardly from the bottom wall 23 and is formed with axially parallel slots 25, 25' (FIGS. 5 and 6) for passage of conductors here shown as brush studs 26. Such brush studs extend through the slots 25 or 25', depending on the direction of rotation of the armature 13.

Figure 4:
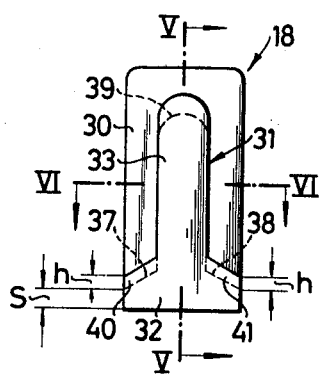
FIG. 4 is a plan view of a brush holder.

Each brush holder 18 has a flat side face 30 which is adjacent to one side of the carrier 19. Each side face 30 is provided with a male coupling portion or projection 31 of T-shaped outline (FIGS. 4–6), and each such projection has a longitudinally extending web or portion 33 and a transversely extending web or portion 32. The projections 31 extend through T-shaped openings or cutouts 34 provided in the adjoining female portions of the carrier 19, and each such opening 34 includes a longitudinally extending portion 36 and a transversely extending portion 35. The portions 36 are only slightly wider than the corresponding longitudinal webs 33 so that the surfaces flanking the portions 36 serve as a means for guiding the projections 31 for radial movement with reference to the commutator 16.

Those edge faces (40 and 41) of each transverse web 32 which face away from the commutator 16 are undercut to define grooves 37, 38. Also, the outer edge face 42 of each longitudinal web 33 is undercut to define a groove 39. The width $a$ of grooves 37, 38 and 39 equals or exceeds only slightly the wall thickness of the carrier 19 and these grooves respectively receive the edge portions 43, 44, 45 of the carrier 19 when the brush holders 18 are properly mounted on the carrier. The depth of grooves 37–39 is shown at $h$. When the projection 31 of a brush holder 18 extends into the corresponding opening 34, the spring 22 in such brush holder operates between the brush 17 and the bottom wall 23 to urge the brush against the commutator 16 and to simultaneously maintain the edge portions 43, 44, 45 in the adjoining grooves 37, 38, 39 whereby the brush holder 18 is properly coupled to the carrier 19 and is held against any movement as long as the corresponding brush bears against the commutator. Each brush holder 18 is then maintained at a predetermined distance from the axis of the armature 13.

The height H of the transverse portion 35 of each opening 34 exceeds the height S of a transverse web 32 plus the depth $h$ of a slot 37, 38 or 39. This allows for rapid detachment of a brush holder 18 from the carrier 19. Thus, the operator simply pushes a brush holder 18 radially inwardly so that the corresponding spring 22 stores energy. When the brush holder is displaced by the distance $h$, the projection 31 can be withdrawn from its opening 34. The procedure is reversed when the operator wishes to reattach the brush holder to the carrier 19.

Figure 7:
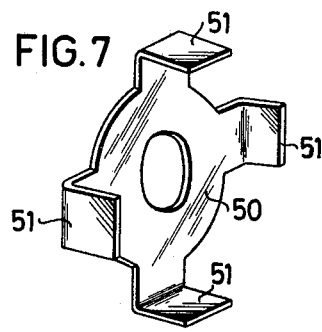
FIG. 7 is a perspective view of an auxiliary assembling device which can be utilized to facilitate mounting of brush holders on the carrier.

The mounting of brush holders 18 on the carrier 19 outside of the housing 11, 12 can be facilitated by resorting to an auxiliary assembling device 50 shown in FIG. 7 and serving as a temporary substitute for the commutator 16. The device 50 has a disk-shaped body provided with four equidistant axially parallel prongs 51 which can be inserted into the radially innermost regions of transverse portions 35 of openings 34 in the carrier 19. The brush holders 18 are thereupon connected with the carrier so that their brushes 17 bear against the outer sides of the respective prongs 51. If the auxiliary device 50 is used in assembly of brush holders with the carrier 19, the height H of each opening portion 35 must be increased by the thickness of a prong 51.

The auxiliary device 50 is coupled to that side of the carrier 19 which faces away from the brush holders 18 so that the prongs 51 extend into the respective transverse opening portions 35 and before the carrier 19 is mounted in the cover 11. The brush holders 18 are thereupon mounted on the carrier 19 and the latter is moved toward the commutator 16 so that the peripheral surface of the commutator is located within the confines of the area surrounded by the prongs 51. In the next step, the device 50 is detached from the carrier 19 so that the brushes 17 bear against the commutator 16, and the carrier 19 is thereupon bolted to the cover 11. In the last step, the main portion 12 of the housing is applied around the armature 13 and is connected with the cover 11.

An important advantage of the novel mode of mounting the brush holders 18 on the carrier 19 is that brush vibration is prevented in a very simple way and also that the assembly of brush holders with the carrier can be completed without resorting to any tools. This is of advantage when the assembly is carried out in automatic machinery or when the automatic machinery is used to separate the brush holders from the carrier.

It is clear that the improved machine can be modified in a number of ways without departing from the spirit of the present invention. For example, the helical springs 22 can be replaced by packages of dished springs, by leaf springs or by other resilient means. Moreover, each brush holder 18 can be provided with several projections each of which can be accommodated in a separate opening of the carrier 19 or an analogous carrier. Furthermore, the carrier could form an integral part of the housing.

What is claimed as new and desired to be protected by Letters Patent is set forth in the appended claims.

1. In an electrical machine, particularly in an electric motor, a combination comprising a housing, a commutator rotatably mounted in said housing and having a peripheral surface; a brush adjacent to said peripheral surface; brush holder means accommodating said brush for movement substantially radially of said surface; carrier means provided in said housing; interengaging male and female coupling portions, one of said portions being provided on said carrier means and the other portion being provided on said brush holder means; and resilient means operating between said brush and said brush holder means to bias said brush against said peripheral surface and to simultaneously maintain said coupling portions in engagement with each other.

2. A combination as defined in claim 1, wherein said female portion is provided on said carrier means and wherein said female portion holds said male portion and said brush holder means against movement radially and away from said commutator.

3. A combination as defined in claim 2, wherein said carrier means comprises a plate mounted in said housing in a plane extending substantially at right angles to the axis of said commutator and wherein said brush holder means is adjacent to one side of said plate, said male coupling portion comprising at least one projection on said brush holder means and said female coupling portion forming part of said plate and having at least one opening for said projection.

4. A combination as defined in claim 3, wherein said projection has at least one groove and said part of said plate includes an edge portion which is biased into said groove by said resilient means.

5. A combination as defined in claim 1, wherein said brush holder means consists of synthetic plastic material.

6. A combination as defined in claim 1, wherein said brush holder means has an open end adjacent to said commutator and a bottom wall remote from said open end, said brush being received in said brush holder means for movement through said open end toward and away from said bottom wall and said resilient means being interposed between said brush and said bottom wall.

7. A combination as defined in claim 1, wherein said carrier means comprises a plate and said brush holder means has a side face adjacent to one side of said plate, said male coupling portion comprising a substantially T-shaped projection on said side face and said female coupling portion forming part of said plate and being provided with a substantially T-shaped opening for said projection.

8. A combination as defined in claim 7, wherein said projection has a transverse web adjacent to said commutator and a longitudinal web extending substantially radially of said commutator and away from said transverse web, said webs having edge faces facing away from said commutator and provided with grooves and said plate having edge portions adjacent to said opening and received in said grooves under the action of said resilient means.

9. A combination as defined in claim 1, further comprising additional brushes, and additional brush holder means and additional resilient means for such additional brushes, said brushes being equidistant from each other and each thereof being urged by the respective resilient means against said peripheral surface.

10. A combination as defined in claim 1, wherein said brush holder means resembles a cup and is provided with at least one axially parallel slot, and further comprising conductor means connected with said brush and extending outwardly from said brush holder means through said slot.

References Cited

UNITED STATES PATENTS

| | | | |
|---|---|---|---|
| 1,923,864 | 8/1933 | Graham et al. | 310—239 |
| 1,935,789 | 11/1933 | Cullin | 310—239 |
| 1,991,356 | 2/1935 | Anderson | 310—239 |
| 2,275,613 | 3/1942 | Cullin | 310—245 |
| 2,584,214 | 2/1952 | Luther et al. | 310—247 |
| 2,870,354 | 1/1959 | Antonidis et al. | 210—247 |
| 3,026,432 | 3/1962 | Baumhart | 310—239 |
| 3,138,728 | 6/1964 | Videtic | 310—247 |

MILTON O. HIRSHFIELD, Primary Examiner

L. L. SMITH, Assistant Examiner

U.S. Cl. X.R.

310—247